United States Patent
Oh et al.

[11] Patent Number: 5,818,431
[45] Date of Patent: Oct. 6, 1998

[54] INPUT/OUTPUT SIGNAL TRANSMITTING STYLUS

[75] Inventors: Seung-cheol Oh; Tae-hyu Oh, both of Kyungki-do, Rep. of Korea

[73] Assignee: Samsung Display Devices Co., Ltd., Kyungki-do, Rep. of Korea

[21] Appl. No.: 544,313

[22] Filed: Oct. 17, 1995

Related U.S. Application Data

[63] Continuation-in-part of Ser. No. 278,244, Jul. 21, 1994, abandoned.

[30]   Foreign Application Priority Data

Jul. 26, 1993 [KR]   Rep. of Korea ...................... 93-13946

[51] Int. Cl.$^6$ ...................................................... G09G 5/00
[52] U.S. Cl. ............................................................. 345/179
[58] Field of Search ..................................... 345/179–183; 178/18, 19

[56]   References Cited

U.S. PATENT DOCUMENTS

| | | | |
|---|---|---|---|
| 4,667,182 | 5/1987 | Murphy | 345/179 |
| 4,883,926 | 11/1989 | Baldwin | 345/179 |
| 4,959,511 | 9/1990 | Lloyd et al. | 178/18 |
| 5,177,472 | 1/1993 | Taniishi et al. | 345/179 |
| 5,355,100 | 10/1994 | Riggio, Jr. | 345/179 |

*Primary Examiner*—Amare Mengistu
*Attorney, Agent, or Firm*—Leydig, Voit & Mayer, Ltd.

[57]   ABSTRACT

An input/output signal transmitting stylus includes an external case, a cylindrical body within the external case, a pickup rod partially within the cylindrical body and for outputting a signal, a transducer connected with the pickup rod for actuating a switching operation, a transducer operated by the transducer actuator, a circuit substrate for interfacing a signal input by the pickup rod, and spring within the cylindrical body and engaging the pickup rod enabling the pickup rod to reciprocate linearly within the external case and cylindrical body. The cylindrical body includes opposite front and rear walls and the pickup rod includes a disk disposed between the first and second walls so that the movement of the pickup rod is limited in two directions. Therefore, the pressure applied to the transducer is limited. The cylindrical body provides protection to the spring by preventing the intrusion of foreign matter extending the lifetime of the stylus.

11 Claims, 3 Drawing Sheets

INPUT/OUTPUT SIGNAL TRANSMITTING STYLUS

This application is a continuation-in-part of patent application Ser. No. 08/278, 244, filed Jul. 21, 1994 , now abandoned.

BACKGROUND OF THE INVENTION

The present invention relates to an input/output signal transmitting stylus which can be used as an input unit for a digitizer, and more particularly, to an input/output signal transmitting stylus which can sense the instant when the stylus is used as an input unit and simultaneously transmit the input signal.

Due to the remarkable development of electronic equipment, the technologies for generating a series of signals controlled by electrographic devices have been taking diverse approaches. Also, the industrial demand for such electrographic devices has been naturally increased in accordance with the advent of computer graphics, computer aided design (CAD), computer aided manufacturing (CAM), etc.

A digitizer is one of the devices having electrographic elements. The digitizer, the origin of pen computers which are currently being popularized rapidly, reproduces information or performs desired work by directly drawing characters, symbols or images on a digitizing pad by means of a stylus which is similar to an electronic pen. The digitizer typically has a complex internal structure having grid type electrodes. Although a grid-type digitizer supplies a minute linear output signal, the manufacturing cost is high due to its complex structure. Also, it is prone to damage in the course of ordinary usage.

FIG. 1 is a schematic structural diagram of an embodiment of a conventional digitizer. Referring thereto, the digitizer 9 includes a body 1 having a display panel 2 and a stylus 3 as an input unit for inputting a character or an image. Also, the body 1 and the stylus 3 are connected with a controller 4 by means of connection cords 5 and 5'. A signal used for recognizing coordinates is periodically transmitted from the controller 4 to the display panel 2. Although a hard wire connection in which the stylus 3 is connected by the cord 5 is shown in this embodiment, a wireless connection having no connection cord from the stylus 3 may be also adopted. As for the controller 4, in addition to a type separated from the body, as shown, there is a type integrated with the body 1.

FIG. 2 is a cross-sectional view of the stylus shown in FIG. 1. Referring to FIG. 2, the stylus 10 has a through hole 18 in one end of an external case 16 creating a predetermined space. A rectilinearly reciprocating pickup rod 11, which is a medium for inputting a location coordinate signal, is inserted and secured in the through hole 18. A transducer actuator 13 is installed at the internal end of the pickup rod 11. A transducer 14 which is incorporated into a switch having a membrane structure is installed to the rear of the transducer actuator 13.

Now, the sequential operation of the transducer 14 will be briefly described.

If the pickup rod 11 is pressed for inputting a figure or a character, the pickup rod 11 pushes the transducer actuator 13 and then the transducer actuator 13 presses the transducer 14 to transmit the input figure or character to a control unit (not shown). Simultaneously, the signal is transmitted to a rearward electronic circuit connected through a conductive spring 12 to operate the circuit.

Meanwhile, a printed circuit board (PCB) substrate 15 including the electronic circuit is installed to the rear of the transducer 14. As shown, a spring 12 is installed in the pickup rod 11, which enables the pickup rod 11 to reciprocate rectilinearly and, at the same time, functions as the connection line for transmitting a signal to the PCB substrate 15. Here, a reference numeral 17 represents a connection part between the PCB substrate 15 and the spring 12.

However, in the conventional stylus having such structure as described above, since the signal inputting or outputting through the pickup rod 11 is transmitted by the spring 12 itself, the spring exposed externally and the connection part between the spring and the pickup rod are easily contaminated by foreign matter like dust, depending on usage circumstances. Accordingly, a connection deficiency is often occurs. Also, as the usage frequency is increased, the elasticity of the spring at wound part 19 is weakened, which is also a cause of connection inferiority.

SUMMARY OF THE INVENTION

In order to solve the above problems, it is an object of the present invention to provide an input/output signal transmitting stylus which can prevent a connection deficiency related to a signal transmission by improving the connection mechanism between a pickup rod and a spring.

It is another object of the present invention to provide an input/output signal transmitting stylus which limits the amount of mechanical movement to substantially only that amount of movement that is required to activate the transducer and thereby operate the stylus.

To accomplish the above objects, the input/output signal transmitting stylus according to one embodiment of the present invention comprises:

an external case having a through hole formed in one end of the body thereof and a predetermined internal space;

a pickup rod secured in the through hole for inputting a location coordinate signal to a display;

a transducer actuator placed rearwards of the pickup rod for driving a switch operation;

a transducer operated by the transducer actuator;

a circuit substrate for intermediating the signal of the pickup rod with the display; and wherein a spring is installed in the pickup rod so as to have an unidirectional elastic force, the spring is installed internally in a separate cylindrical body installed within the external case, and the cylindrical body and the circuit substrate is electrically connected by a separate wire.

As described above, according to the present invention, since a spring providing an elasticity with a pickup rod is installed in a predetermined cylindrical body, the spring is not easily exposed externally, thereby preventing the spring deterioration. Also, in contrast with the conventional connection mechanism, the pickup rod and the internal circuit substrate are connected by a separate wire in the present invention, thereby preventing connection deficiency. Therefore, if the input/output transmitting stylus according to the present invention is used for a digitizer and other similar systems, the reliability of a system with respect to a signal input/output will be greatly improved.

According to a second embodiment of the present invention, the input/output signal transmitting stylus of the present invention is further provided with means for limiting the amount of movement of the pick-up rod with respect to the external case to substantially only that amount of movement necessary to activate the transducer.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 3:
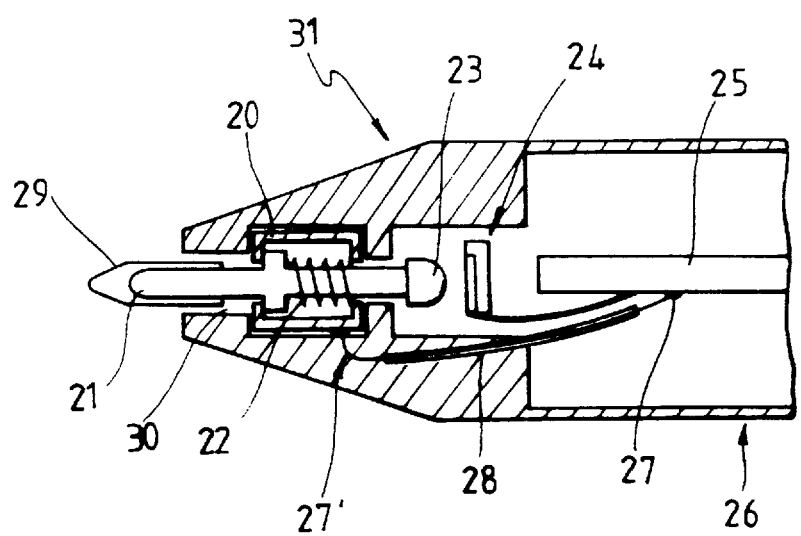
FIG. 3 is a cross-sectional view of an input/output signal transmitting stylus according to a first embodiment of the present invention.

Referring to FIG. 3, there is illustrated an input/output signal transmitting stylus 31 in accordance with a first embodiment of the present invention. The input/output signal transmitting stylus is provided with a through hole 30 formed in one end of an external case 26 having an enclosed space. A pickup rod 21, which is a medium for inputting a location coordinate signal to a display panel 2 (refer to FIG. 1), is inserted and secured in the through hole 30 so that the pickup rod 21 may reciprocate forward and backward. Also, a transducer actuator 23 is provided at the inner end of the pickup rod 21. Transducer 24, which is incorporated into a switch having a membrane structure, is installed right in the rear of and is operated by the transducer actuator 23. A PCB substrate 25 includes an electronic circuit and is positioned to the rear of the transducer 24. In the meantime, a compression spring 22 is wrapped around in the pickup rod 21, as shown in FIG. 3. This offers an elasticity which enables a rectilinear reciprocation of the pickup rod 21. Here, the compression spring 22 and one part of the body of the pickup rod 21 surrounded by the spring are located within cylindrical body 20, which prevents the spring from becoming contaminated by the external factors such as dust or other foreign matter. The spring is installed within a vessel, different from the conventional exposed spring arrangement. Additionally, since compression spring 22, different from the conventional one, is wrapped around the body of the pickup rod 21, the elasticity works in parallel with the reciprocating direction of the pickup rod 21, thereby enabling the pickup rod 21 to receive a sufficient force at all times. Therefore, the transducer actuator 23 operates with precision, which causes the transducer 24 to perform a switching operation definitively. Also, the cylindrical body 20 and the PCB substrate 25 are electrically connected by means of a flexible signal connection line 28. Therefore, according to the present invention, such a problem as connection deficiency does not occur, in contrast with the signal transmission method by the conventional spring. Also, although not shown in the accompanying drawings, the pickup rod 21 and the signal connection line 28 are electrically connected. Here, reference numerals 27 and 27 'are connection parts of both ends of the signal line 28.

Meanwhile, the input/output transmitting stylus according to the present invention can be used for a device which requires an exact input/output of signals irrespective of the free movement of a pickup rod forward and backward as well as the stylus for a digitizer.

Also, in general, the tip 29 made of plastic material or the ball tip having a ball in its end is preferably adopted for the end of the pickup rod 21, for protecting the pickup rod or display panel and for softening the manual feeling during writing.

Figure 1:
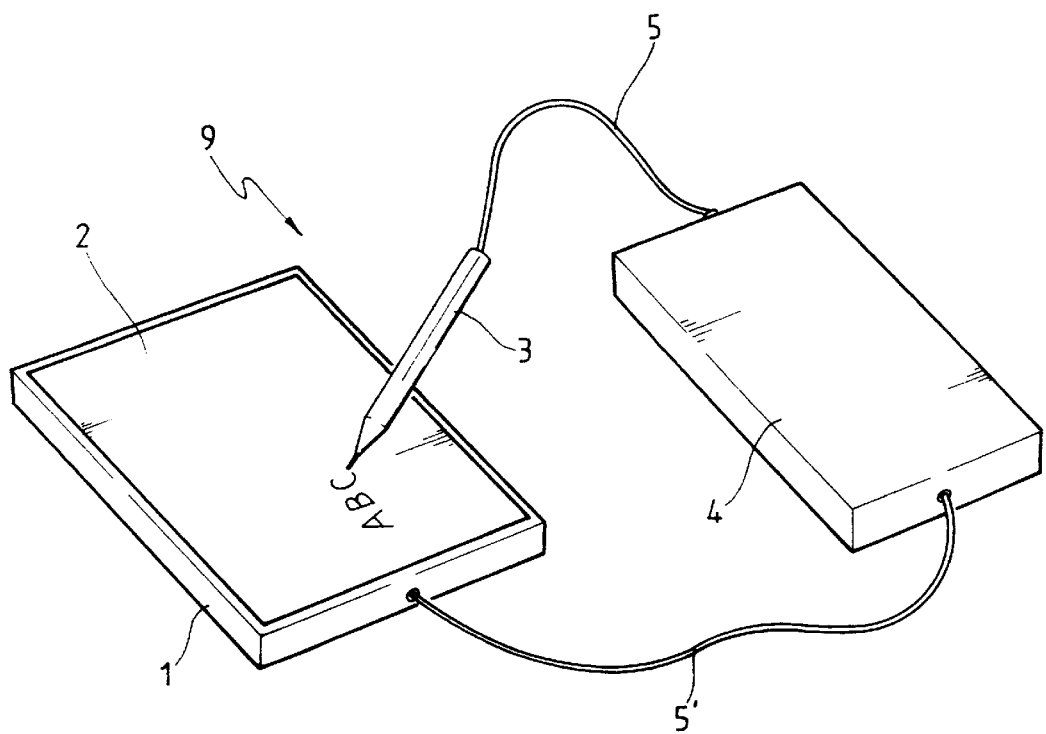
FIG. 1 is a schematic structural diagram of an embodiment of the conventional digitizer.
Figure 2:
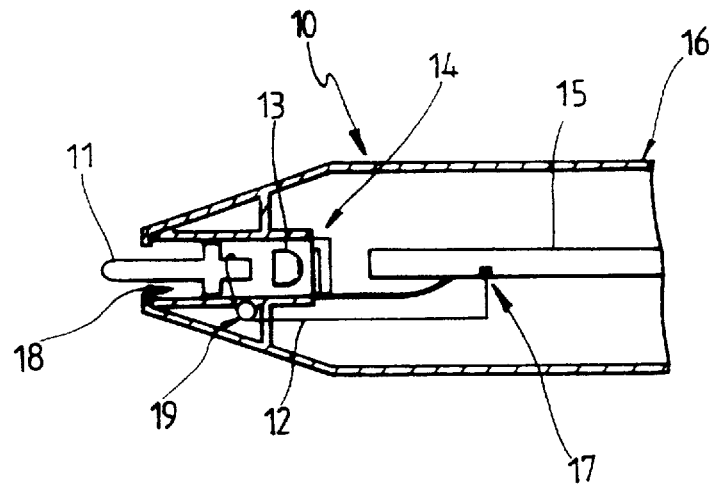
FIG. 2 is a cross-sectional view of the stylus 10 shown in FIG. 1.

Next, the operation of the input/output signal transmitting stylus according to the present invention having the aforementioned structure will be briefly described with reference to FIGS. 1 and 3.

If the pickup rod 21 of the input/output signal transmitting stylus 31 is pressed against a display panel 2 of a digitizer 1 to write a character or to a symbol or recognize a coordinate point, the pickup rod 21 having been pushed forward by the elasticity of the spring 22 is pushed backward. Then, the transducer actuator 23 located backward of the pickup rod 21, is also pushed backward and thereby makes contact with the transducer having a thin membrane structure and pushes the thin membrane lightly. Thereby, the tile transducer 24 switches on and off, accordingly. In response to the on/off signal generated at this time, the controller 4 (refer to FIG. 1) senses whether the input/output signal transmitting stylus 31 should be activated. The signal transmitted to the electronic circuit of the PCB substrate 25 through the signal line 28 connected with the body of the pickup rod 21 is transmitted to the controller 4 from the instant when the signal is sensed. Then, the controller, which is periodically sending a predetermined signal for recognizing coordinates to the display panel 2, recognizes a character or an image formed on the panel by a received signal according to a stored program In a series of processes as described above, since the pickup rod 21 receives a sufficient force constantly from compression spring 22, signals are transmitted consistently without connection deficiency, thereby enabling the successively interlocked transducer actuator 23 and transducer 24 to be operated with precision. Therefore, the controller 4 controls signals exactly without omission or damage of a signal due to connection deficiencies. Thus, the reliability in the inputting and outputting of signals is improved greatly. Furthermore, as described above, since the constant portion of the pickup rod 21 embraced by the compression spring 22 is installed internally in the cylindrical body 20 having a predetermined space, the compression spring 22 is scarcely contaminated by normal external circumstances Referring now to FIG. 4, there is illustrated another embodiment of the present invention. Elements of the embodiment of FIG. 4 which are similar to elements of the embodiment are FIG. 3 are provided with the same reference numerals, while the external case 26 of the stylus, which securely retains the cylindrical body 20 and the PCB substrate 25, has been omitted from the drawing of FIG. 4 for ease of illustration. According to the embodiment of FIG. 4 the input/output transmitting stylus of the present invention is further provided with means to more precisely control the movement of the pickup rod 21 with respect to the cylindrical body 20. The compression spring 22 is installed within the cylindrical body 20 and enables rectilinear reciprocation of the pickup rod 21 with respect to the cylindrical body 20 and the stylus.

Figure 4:
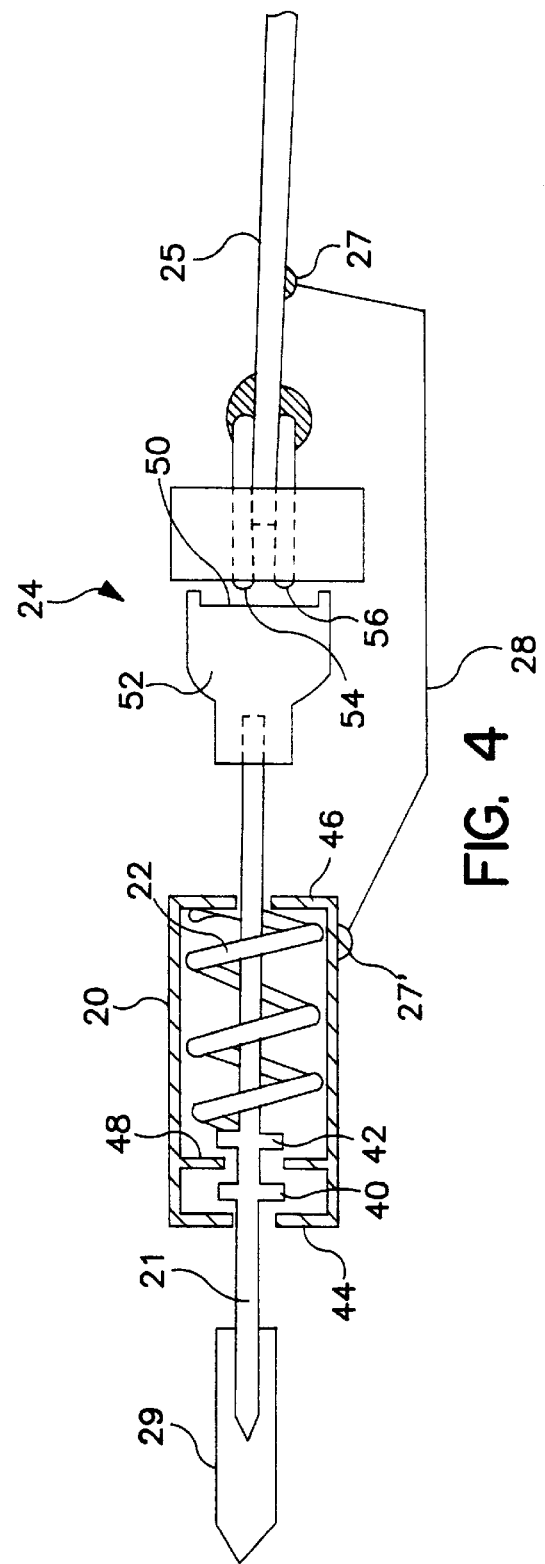
FIG. 4 is a cross-sectional view of an input/output signal transmitting stylus according to a second embodiment of the present invention.

According to an important feature of this embodiment of the invention, the movement of the pickup rod is more precisely controlled by means of a pair of disklike members 40 and 42 attached to the pickup rod 21 which interacts with surfaces of the cylindrical body 20. A front disk-like member 40 and a back disk-like member 42 are disposed upon the pickup rod 21 within the cylindrical body 20. The disk-like members limit the movement of the pickup rod 21 between a normal forward position when the transducer is not activated and a rearward position when pressure upon the tip 29 results in activation of the transducer 24. As with the embodiment of the invention illustrated in Fig. 3, the cylindrical body 20 of the embodiment of FIG. 4 is provided with a front wall 44 and a back wall 46, each of which have an aperture to retain and guide the movement of the pickup rod with respect to the cylindrical body 20. In addition, the embodiment of FIG. 4 further provides an intermediate wall 48 within the cylindrical body 20.

Like the front wall 44 and the back wall 46, the intermediate wall 48 is provided with an aperture which serves to guide the movement of the pickup rod 21. The back surface of the front wall 44 and the front surface of the intermediate wall 48 serve as abutment surfaces for the front disk-like member 40 that limits and defines the range of reciprocating movement of the pickup rod 21 with respect to the cylindrical body 20. When the pickup rod 21 is in its normal, unactivated position, the pickup rod 21 is urged forward by the force of the spring 22 acting upon the back wall 44 of the cylindrical body and the back disk-like member 42 of the of pickup rod 21. The pickup rod 21 moves forward with respect to the cylindrical body 20 to a point where the front disk-like member 40 abut against the back surface of the front wall 44. This defines and limits the range of forward movement of the pickup rod 21 with respect to the cylindrical body 20.

When pressure is applied to the tip of the pickup rod, such as when the stylus is pressed against a display panel, the spring 22 is compressed and the pickup rod 21 moves back with respect to the cylindrical body 20 until the front disk-like member 40 abuts against the front surface of the intermediate wall 48 of the cylindrical body 20. This arrangement defines and limits the range of rearward movement of the pickup rod 21 with respect to the cylindrical body 20.

According to an important aspect of the present invention, the intermediate wall 48 is disposed at a predetermined distance from the front wall 42 such that when the front disk-like member abuts against the intermediate wall 48, a contact pad 50, which is carried upon the back of a contact pad carrier 52 attached to the pickup rod 21, makes an activating contact with pins 54 and 56 connected to the PCB substrate 25. Preferably, the contact pad carrier 52 is made from a resilient material, such as rubber, that provides sufficient support for the contact pad 50 to make an activating contact against the contact pins 54 and 56 but deforms slightly to prevent an excessive force from being transmitted to the contact pins 54 and 56 from the contact pad 50. Thus, according to this embodiment or the invention, the intermediate wall 48 of the cylindrical body 20, the front disk-like member 40 and the resilient nature of the contact pad carrier 52 perform to more precisely and reliably control the movement of the pickup rod 21, thereby ensuring certain activation when desired and preventing excessive force upon the PCB substrate which could result in damage or malfunction.

As described above, according to the input/output signal transmitting stylus of the present invention, since the spring providing the pickup rod with elasticity is installed internally in a cylindrical body, the spring is not easily exposed to external circumstances, thereby preventing spring deterioration. Also, since the connection mechanism of the pickup rod and the internal circuit substrate are connected by a separate wire, differently from the conventional mechanism, a connection deficiency can be avoided. Therefore, if the input/output signal transmitting stylus according to the present invention is used for a digitizer and other similar systems, the reliability of the system with respect to signal input and output will be improved greatly.

What is claimed is:

1. An input/output signal transmitting stylus comprising:
    an external case having a through hole in one end and an internal space adjacent the through hole;
    a pickup rod secured in the through hole for inputting a location coordinate signal to a display;
    a transducer actuator connected to said pickup rod;
    a transducer operated by said transducer actuator;
    a circuit interfacing a location coordinate signal input by said pickup rod with the display;
    a spring engaging said pickup rod and enabling said pickup rod to reciprocate axially with respect to said external case;
    a cylindrical body disposed within the internal space, surrounding part of said pickup rod, enclosing said spring to protect said spring from foreign matter, and including a first wall having a central aperture and a second wall, opposite the first wall, having a central aperture aligned with the central aperture in said first wall, said pickup rod passing through the central apertures in said first and second walls, and a first disk member attached to said pickup rod and disposed within said cylindrical body between said first and second walls for abutment with said first and second walls, thereby limiting movement of said pickup rod; and
    a signal connection line interconnecting said circuit substrate and said cylindrical body.

2. The input/output signal transmitting stylus as claimed in claimed 1 further comprising a tip mounted on the end of said pickup rod.

3. The input/output signal transmitting stylus as claimed in claim 1 wherein said cylindrical body limits movement of said pickup rod with respect to said cylindrical body to substantially only that movement necessary to permit activation of said transducer.

4. The input/output signal transmitting stylus as claimed in claim 1 including as second disk member attached to said pickup rod and spaced from said first disk member, and a third within said cylindrical body disposed between said first and second walls and between said first and second disks, said third wall limiting movement of said pickup rod and the force applied by said rod to said transducer by said transducer actuator by abutment with said first and second disk members.

5. The input/output signal transmitting stylus as claimed in claim 4 wherein said third wall includes a central aperture aligned with the central apertures in said first and second walls and through which said pickup rod extends.

6. An input/output signal transmitting stylus comprising:
    a case having a through hole in one and an internal space housing a body;
    an input device disposed in the through hole for inputting a signal to a receiving device, at least a part of said device being disposed within said body;
    a moveable transducer actuator connected to said input device;
    a transducer educated by said movable transducer actuator for switching; p1 a circuit interfacing a signal input by said input device with the receiving device;
    a spring operatively associated with said input device and disposed entirely within said body, the body including means for defining a limited range of linear movement of said input device with respect to said body;
    a first disk member attached to said input device, wherein said body includes a first wall limiting movement of said input device, in a first direction and a second wall, opposite said first wall, and limiting movement in a second direction, opposite the first direction; and p1 a signal connection line interconnecting said circuit and said body.

7. The input/output signal transmitting stylus as claimed in claim 6 wherein said transducer actuator is disposed outside the body.

8. The input/output signal transmitting stylus as claimed in claim 6 wherein the input device includes a pick-up rod.

9. The input/output signal transmitting stylus as claimed in claim 8 including a plastic tip mounted on an end of the pick-up rod.

10. The input/output signal transmitting stylus as claimed in claim 6 wherein said signal connection line is disposed outside of the body.

11. The input/output signal transmitting stylus as claimed in claim 6 including a second disk member attached to said input device and spaced from said first disk member, and a third wall within said cylindrical body disposed between said first and second and between said first and second disks, said third wall limiting movement of said input device and the force applied by said input device to said transducer by said transducer actuator by abutment with said first and second disk members.

* * * * *

UNITED STATES PATENT AND TRADEMARK OFFICE
CERTIFICATE OF CORRECTION

PATENT NO. : 5,818,431
DATED : October 6, 1998
INVENTOR(S) : Oh et al.

It is certified that error appears in the above-identified patent and that said Letters Patent is hereby corrected as shown below:

Column 6, Line 38, change "as" to --a--;

Line 40, after "third" insert --wall--;

Line 43, after "said" (first occurrence) insert --pickup--;

Line 51, after "one" insert --end--;

Line 54, after "said" insert --input--;

Line 59, change "educated" to --actuated--;

Line 60, delete "p1";

UNITED STATES PATENT AND TRADEMARK OFFICE
CERTIFICATE OF CORRECTION

PATENT NO.   : 5,818,431
DATED        : October 6, 1998
INVENTOR(S)  : Oh et al.

It is certified that error appears in the above-identified patent and that said Letters Patent is hereby corrected as shown below:

Column 7, Line 3, delete "p1";

Column 8, Line 8, after "second" (first occurrence) insert --walls--.

Signed and Sealed this

Ninth Day of February, 1999

Attest:

Attesting Officer

Acting Commissioner of Patents and Trademarks